(12) United States Patent
Costanzo

(10) Patent No.: US 6,923,309 B2
(45) Date of Patent: Aug. 2, 2005

(54) ARTICLE-ORIENTING CONVEYOR

(75) Inventor: Mark Costanzo, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/605,510

(22) Filed: Oct. 3, 2003

(65) Prior Publication Data

US 2005/0072656 A1 Apr. 7, 2005

(51) Int. Cl.$^7$ ............................................... B65G 47/24
(52) U.S. Cl. ..................... 198/411; 198/779; 198/416
(58) Field of Search ................................. 198/411, 412, 198/416, 415, 779, 399, 400, 382, 383, 394, 398

(56) References Cited

U.S. PATENT DOCUMENTS

| | | | | |
|---|---|---|---|---|
| 3,047,123 A | | 7/1962 | McKay | 198/33 |
| 3,550,756 A | * | 12/1970 | Kornylak | 198/637 |
| 3,679,043 A | * | 7/1972 | Becker | 198/349 |
| 3,799,319 A | * | 3/1974 | Cutler et al. | 198/416 |
| 4,676,361 A | | 6/1987 | Heisler | 198/394 |
| 4,889,224 A | * | 12/1989 | Denker | 198/382 |
| 5,096,050 A | * | 3/1992 | Hodlewsky | 198/779 |
| 5,238,099 A | * | 8/1993 | Schroeder et al. | 198/456 |
| 5,551,543 A | * | 9/1996 | Mattingly et al. | 198/370.09 |
| 6,044,956 A | * | 4/2000 | Henson et al. | 198/370.02 |
| 6,079,544 A | | 6/2000 | Donati et al. | 198/446 |
| 6,148,990 A | | 11/2000 | Lapeyre et al. | 198/779 |
| 6,253,438 B1 | * | 7/2001 | Jespersen | 29/426.4 |
| 6,398,015 B1 | | 6/2002 | Sedlacek et al. | 198/779 |
| 6,494,312 B2 | | 12/2002 | Costanzo | 198/779 |
| 6,571,937 B1 | | 6/2003 | Costanzo et al. | 198/779 |
| 6,758,323 B2 | * | 7/2004 | Costanzo | 198/457.02 |

* cited by examiner

Primary Examiner—Richard Ridley
(74) Attorney, Agent, or Firm—James T. Cronvich

(57) ABSTRACT

A conveyor for orienting and registering articles in a preferred orientation and position for accurate downstream processing. The conveyor includes a conveyor belt running in a conveyance direction next to an orientation belt running parallel in an opposite direction or more slowly in the same direction. The orientation belt has upstanding structure, such as flights, or a high-friction surface. The conveyor belt includes article-supporting rollers on a top side. The rollers are arranged to rotate about axes oblique to the conveyance direction. The rollers also extend below the bottom side of the belt and are rotated by dynamic contact with bearing surfaces supporting the belt as it advances in the conveying direction. The rotating rollers direct conveyed articles toward a side rail. If a portion of a conveyed article extends past the side edge of the conveyor belt into the path of the orientation belt, the obstructions or high-friction surface of the slower- or oppositely-moving orientation belt strikes the conveyed articles and cause them to rotate clockwise toward an alignment of the article in the conveyance direction and into registration against the side rail at the downstream end of the conveyor. In other versions of the article-orienting conveyor, the orientation belt is replaced by a row of posts or a rotating paddle wheel that strikes conveyed articles extending past the side edge of the conveyor belt.

31 Claims, 7 Drawing Sheets

ARTICLE-ORIENTING CONVEYOR

BACKGROUND OF INVENTION

The invention relates generally to power-driven conveyors and, more particularly, to an orientation and registration conveyor using a roller-top conveyor belt.

Many conveying applications require that conveyed articles be aligned single file in a specific orientation for downstream processing or inspection. But it is often not possible to ensure that articles will be placed on a conveyor in the desired alignment and orientation. Consequently, there is a need for a conveyor that can align and orient conveyed articles in spite of their original orientations on the conveyor.

SUMMARY OF INVENTION

This need and other needs are satisfied by a conveyor embodying features of the invention. In one aspect, the conveyor comprises a first conveyor belt and a second belt. The first conveyor belt runs along a conveying path at a first velocity in a conveyance direction. The first conveyor belt extends transverse to the conveyance direction from a first side to a second side. The first conveyor belt includes a plurality of article-supporting rollers arranged to direct supported articles toward the first side as the first conveyor belt runs in the conveyance direction. The second belt is disposed proximate the second side of the first conveyor belt. The second belt runs at a second velocity parallel to the first conveyor belt. The first velocity (of the first conveyor belt) in the conveyance direction exceeds the second velocity (of the second belt) in the conveyance direction. The difference between the velocities causes articles on the first conveyor belt extending past its second side and into contact with the second belt to rotate.

In another aspect of the invention, a conveyor for orienting and registering conveyed articles comprises a conveyor belt with article-supporting rollers. The conveyor belt advances along a conveying path in a conveyance direction from an upstream end to a downstream end. The conveyor belt extends transversely from a first side to a second side. The article-supporting rollers are arranged to direct supported articles toward the first side of the conveyor belt. The conveyor also includes a registration surface disposed at the first side of the conveyor belt at its downstream end against which articles are registered. Orientation means proximate to the second side of the conveyor belt engage those portions of conveyed articles that extend outward from the conveyor belt past its second side. The orientation means impedes the progress of the extending portions of the conveyed articles, thereby causing the extending portion to move onto the conveyor belt in a different orientation from the article's original orientation.

In yet another aspect of the invention, a conveyor for orienting and registering a conveyed article comprises an angled-roller-top conveyor belt and an orientation belt. The angled-roller-top conveyor belt runs at a first speed in a conveyance direction along a conveying path. Article-supporting rollers on the conveyor belt are arranged to rotate about axes oblique to the conveyance direction. The conveyor includes a registration surface parallel to the conveyance direction at a first side of the angled-roller-top conveyor belt. The orientation belt is disposed at the second side of the angled-roller-top belt. The orientation belt runs at a second speed that is opposite the conveyance direction or, if in the conveyance direction, that is slower than the first speed so that there is relative motion between the two belts in the conveyance direction.

The orientation belt engages a conveyed article extending past the second side of the angled-roller-top conveyor belt. The relative motion of the two belts causes the conveyed article engaged by the orientation belt to rotate clockwise toward an alignment of the article with the conveyance direction. As the article is being oriented, the angled-roller-top belt guides it toward and along the registration surface.

BRIEF DESCRIPTION OF DRAWINGS

These and other features, aspects, and advantages of the invention are better understood by reference to the following description, appended claims, and accompanying drawings, in which:

DETAILED DESCRIPTION

Figure 1:
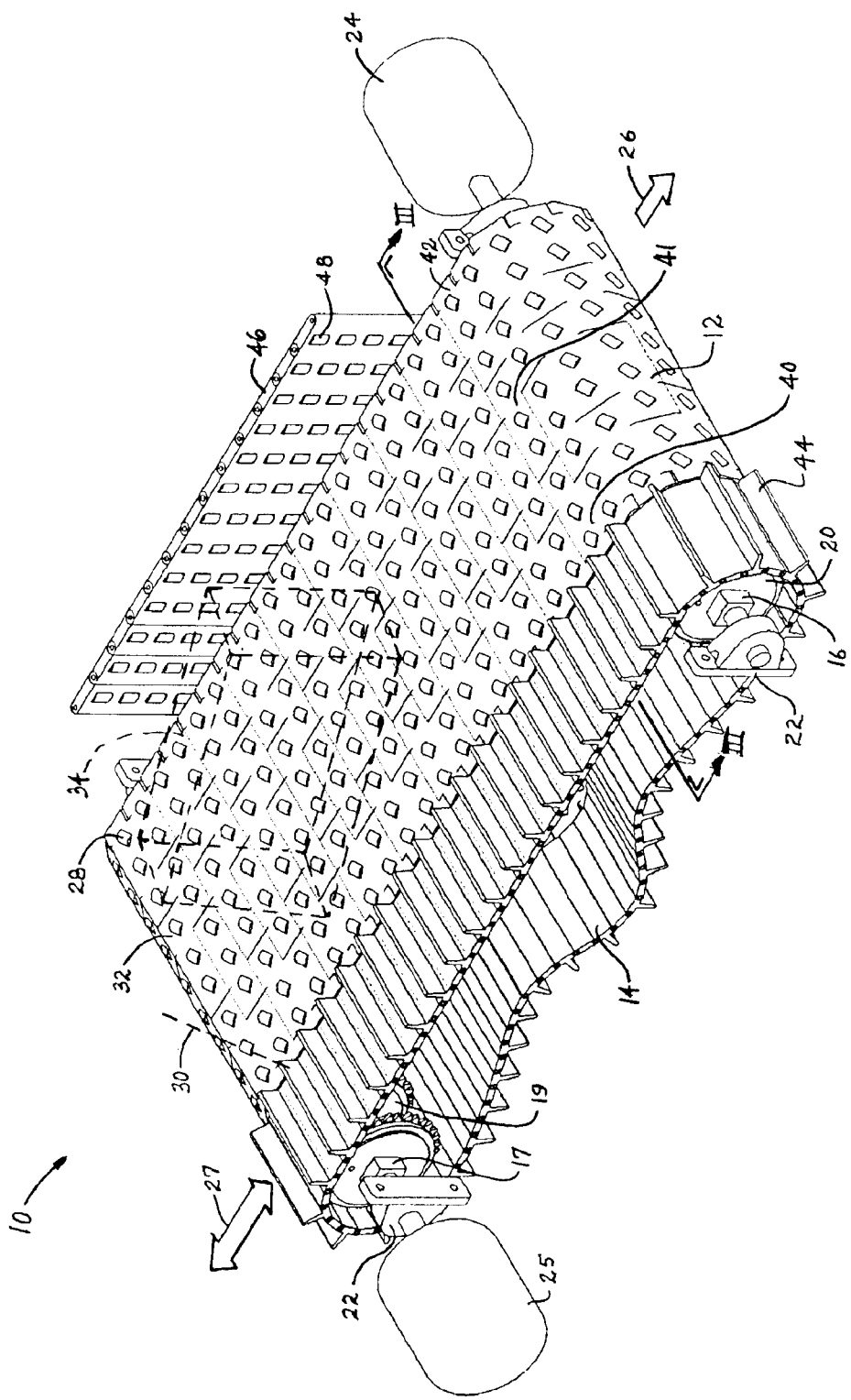
FIG. 1 is an isometric view of one version of an article-orienting conveyor embodying features of the invention, including a flighted orientation belt.
Figure 2:
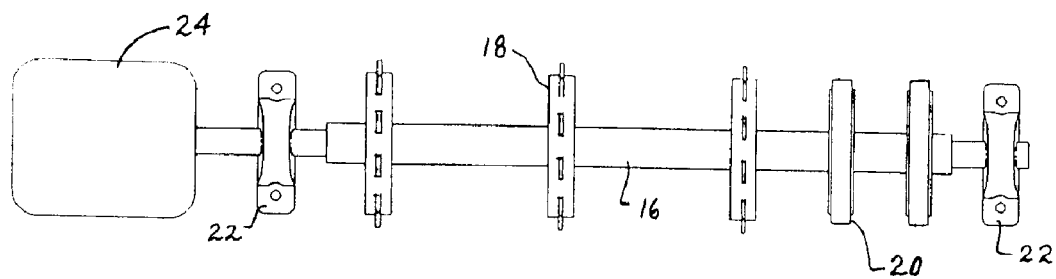
FIG. 2 is a front elevation view of one version of a drive system at one end of a conveyor as in FIG. 1.
Figure 3:
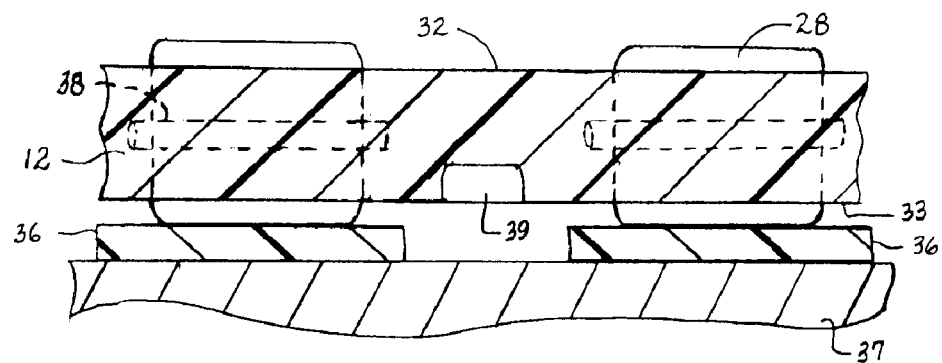
FIG. 3 is a cross-sectional view of a portion of the roller-top belt of FIG. 1 taken along line III—III of FIG. 1.
Figure 4:
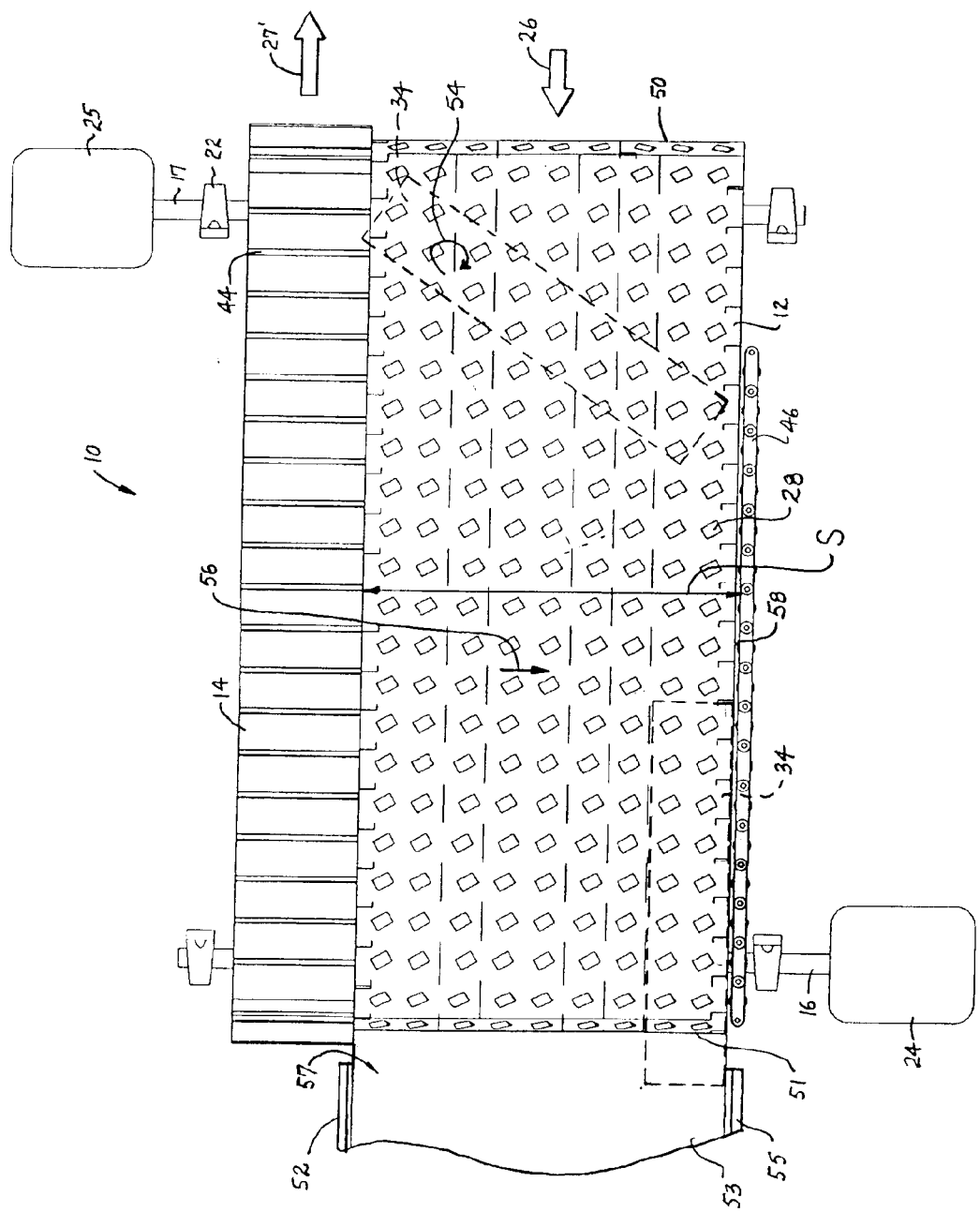
FIG. 4 is a top plan view of the conveyor of FIG. 1.

An orientation and registration conveyor embodying features of the invention is shown in FIG. 1. The conveyor 10 includes two belts: a conveyor belt 12 and an orientation belt 14. The substantially coplanar belts are looped between a pair of shafts 16, 17. One of the shafts 16 serves as a drive shaft for the conveyor belt 12 and includes a set of toothed drive sprockets 18 mounted on the shaft, as shown in FIG. 4. The drive shaft for the conveyor belt also includes a set of idler rollers 20 around which the orientation belt 14 slides. The shaft 16 is supported at its ends by bearing blocks 22 mounted to a conveyor frame (not shown for simplicity). A first drive motor 24 coupled to the shaft 16 drives the conveyor belt 12 in a conveyance direction 26. The other shaft 17 serves as a drive shaft for the orientation belt 14. Toothed drive sprockets 19 for the orientation belt are mounted on the shaft to drivingly engage drive structure on the inner side of the orientation belt. Idler rollers (not shown) are also mounted on the shaft 17. The conveyor belt slides around the idler rollers as it is driven by its drive sprockets 18 on the other shaft 16. A motor 25 drives the shaft 17. The motor can be reversible to drive the orientation belt in either direction 27, but preferably drives the orientation belt only in the direction opposite to the conveyance direction 26.

Figure 5:
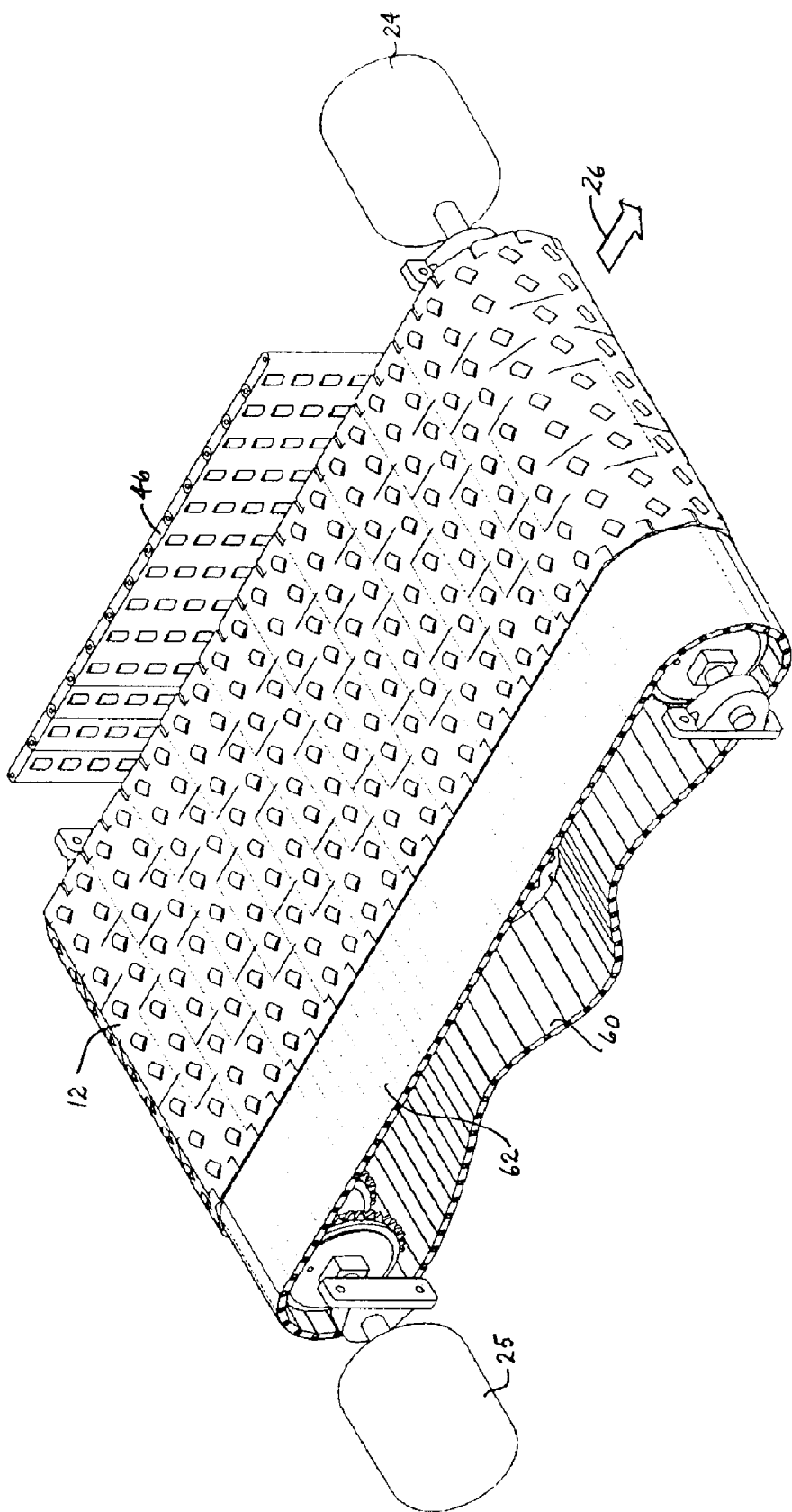
FIG. 5 is an isometric view of another version of article-orienting conveyor in which the orientation belt is a friction-top belt.

The conveyor belt 12 is preferably an angled-roller-top belt in that it includes a plurality of rollers 28 that are arranged to rotate about axes 30 oblique to the conveyance direction 26. A salient portion of the rollers protrudes above the top side of the belt to support articles 34 placed on the belt. As shown in FIG. 5, the rollers also protrude through the bottom side of the belt into contact with supporting wearstrips 36 that provide bearing surfaces on which the rollers rotate as the belt advances in the conveyance direction. The wearstrips are supported on a carryway pan 37. The rollers are preferably generally cylindrical in shape with a central bore admitting an axle 38 that defines the axis of rotation. The ends of the axle are preferably retained in the interior structure of the belt. The drive sprockets 18 drive against drive surfaces 39 formed periodically along the bottom side of the belt.

A preferred conveyor belt is a modular plastic conveyor belt constructed in a bricklay pattern out of a plurality of individual plastic belt modules, including right edge modules 40, interior modules 41, and left edge modules 42. The modules are arranged in rows interconnected by hinge pins into an endless belt loop. The modules are preferably injection molded out of thermoplastic materials such as polypropylene, polyethylene, acetal, nylon, or composite resins that may include fibers or other additives. The rollers may be molded out of similar materials or co-molded out of two materials such as a durable nylon core around the bore with a high-friction outer layer made of rubber or a rubber-like material for good engagement with the wearstrip or the conveyed articles. The axle is preferably made of a strong material, such as stainless steel.

The orientation belt 14 shown in FIG. 1 is also preferably a modular plastic conveyor belt that includes upstanding flights 44. The base of the belt is preferably molded out of one of the same thermoplastics as the conveyor belt. The flight is preferably unitarily formed with the base out of the same material or out of a more resilient elastomer or rubber-like material to prevent it from scratching conveyed articles it contacts.

A side rail 46 is positioned along the left side edge of the conveyor belt. Although the side rail is shown in the drawings parallel to the conveyance direction, it could alternatively be disposed at an angle or curved relative to the conveyance direction and the left side edge of the belt. The side rail includes a plurality of rollers 48 arranged to rotate about vertical axes. The rail registers conveyed articles at the edge of the belt, and the rollers prevent the registered articles from being scuffed as they slide along the rail. If scuffing or friction along the rail is not critical, rollers in the side rail are not needed. The side rail could be realized as a length of roller-top conveyor belt, such as the INTRALOX Series 400 ROLLER TOP belt manufactured and sold by Intralox, Inc. of Harahan, La., USA.

When an article 34 is introduced onto the conveyor belt 12 at its upstream end 50, as best shown in FIG. 4, the article is transported by the conveyor belt in the conveyance direction 26 toward its downstream end 51 to a processing station 52, such as a security scanning device. The processing station may include its own conveyor 53 enclosed in a housing 55 with an aperture 57 through which the articles pass. To insure that no articles get hung up at the aperture, the spacing S between the side rail and the inside edge of the flights 44 is selected to be no wider than the width of the aperture. If an article is oriented on the conveyor belt 12 such that it would not be able to fit through the aperture in that orientation, the article will extend from the side of the conveyor belt onto the orientation belt 14, which is preferably driven in the opposite direction 27'. When the portion of the conveyed article extending past the conveyor belt is struck by a flight 44 on the orientation belt, the flight causes the article to rotate clockwise 54 so that it starts to align with the conveyance direction. As the article is conveyed along the carryway, the angled rollers 28, which are rotating as they roll along the bearing surfaces of the supporting wearstrip, provide a sidewise component of motion 56 to the articles toward the rail 46. Eventually, the articles are oriented so as to fit through the aperture without jamming. The side rail provides a registration surface 58 to the articles along the side edge of the belt. The registration surface, though shown parallel to the conveyance direction, could alternatively be angled or curved inward or outward from the side edge of the belt.

Although it is preferable that the orientation belt be driven in the opposite direction from the conveyor belt, it is critical only that the velocity of the conveyor belt exceed the velocity of the orientation belt in the conveyance direction. Under that condition, the relative speed of the conveyor belt in the conveyance direction is greater than the speed of the orientation belt in the conveyance direction. As long as the motion of the orientation belt is retarded relative to the motion of the conveyor belt in the conveyance direction, the flights will be effective in causing articles extending past the conveyor belt onto the orientation belt to rotate clockwise toward alignment.

The flighted orientation belt 14 of FIGS. 1 and 4 is replaced by a friction-top belt 60 in another version of the alignment conveyor illustrated in FIG. 5. In this version, the outer surface 62 of the orientation belt is topped with a high-friction material, such as rubber or a rubber-like elastomer. The friction between the rubber surface and articles conveyed on the conveyor belt must be great enough to cause the articles extending past the conveyor belt onto the orientation belt to rotate clockwise as long as the conveyor belt is moving at a greater speed than the orientation belt in the conveyance direction 26. In all other respects, this friction-top orientation means operates the same as the flighted orientation means in the article-orienting conveyor.

Figure 6:
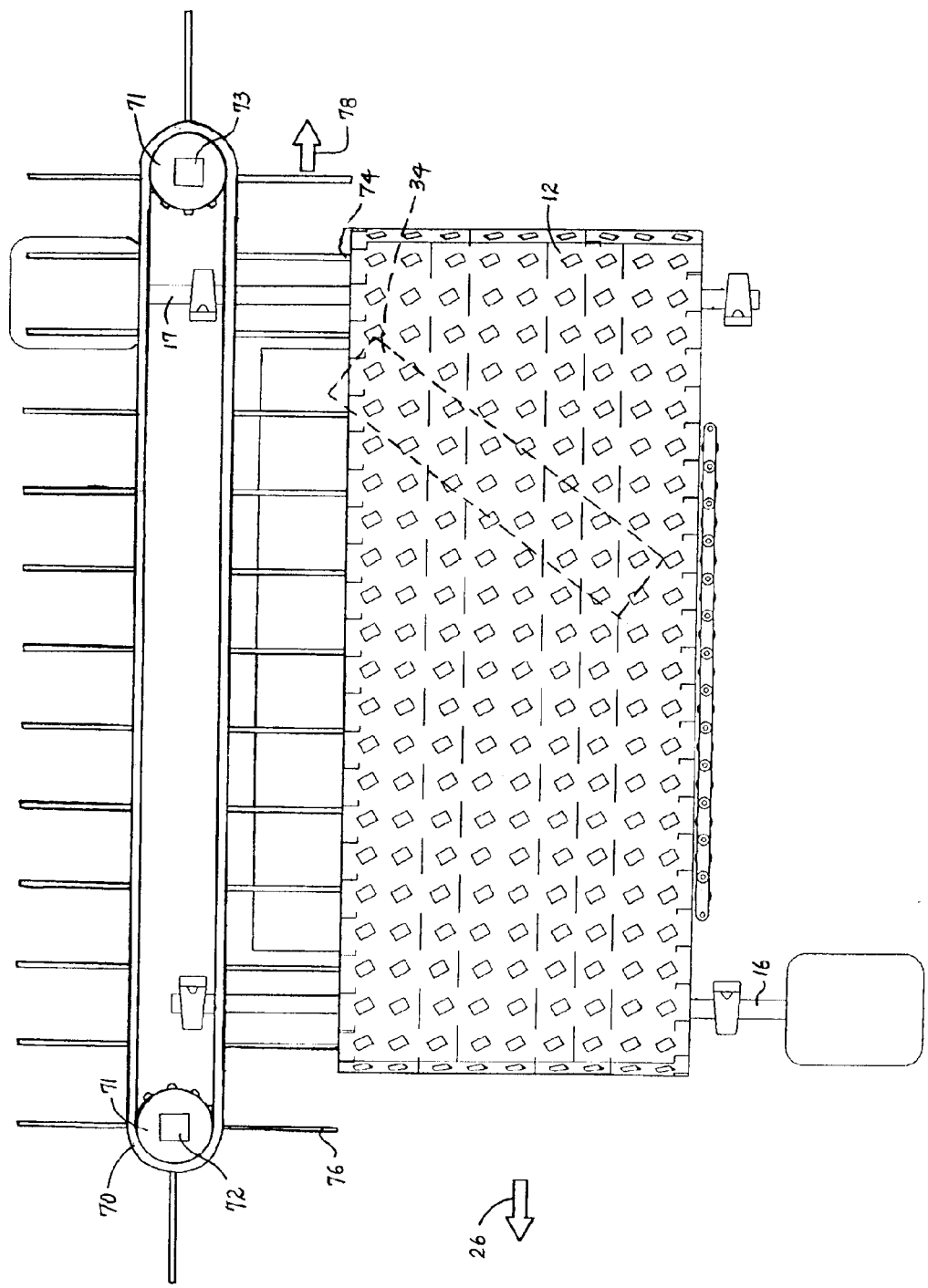
FIG. 6 is top plan view of another version of article-orienting conveyor embodying features of the invention including a flighted orientation belt running in a plane perpendicular to the plane of a conveyor belt.

Still another version of orientation belt is shown in FIG. 6. In this version of article-orienting conveyor, the orientation belt is a flighted belt 70 running in a plane generally perpendicular to the plane of the conveyor belt 12. The orientation belt loops around sprockets 71 on shafts 72, 73 perpendicular to the shafts 16, 17 of the conveyor belt. The distal ends 74 of the spaced apart flights 76 extending outward from the surface of the perpendicular orientation belt run along the right side edge of the conveyor belt. Like the other orientation belts, the perpendicular orientation belt is driven in the direction 78 opposite to the conveyance direction 26 or, if in the same direction, at a speed slower than the speed of the conveyor belt. The flights engage articles 34 extending past the right side edge of the conveyor and rotate them toward the preferred orientation. Of course, the orientation belt could be arranged at an angle relative to or even perpendicular to the orientation belt shown in FIG. 6, as long as the flights have a component of motion at the right side edge of the conveyor belt that is opposite to or retarded in speed relative to the speed of the conveyor belt in the conveyance direction.

Figure 7:
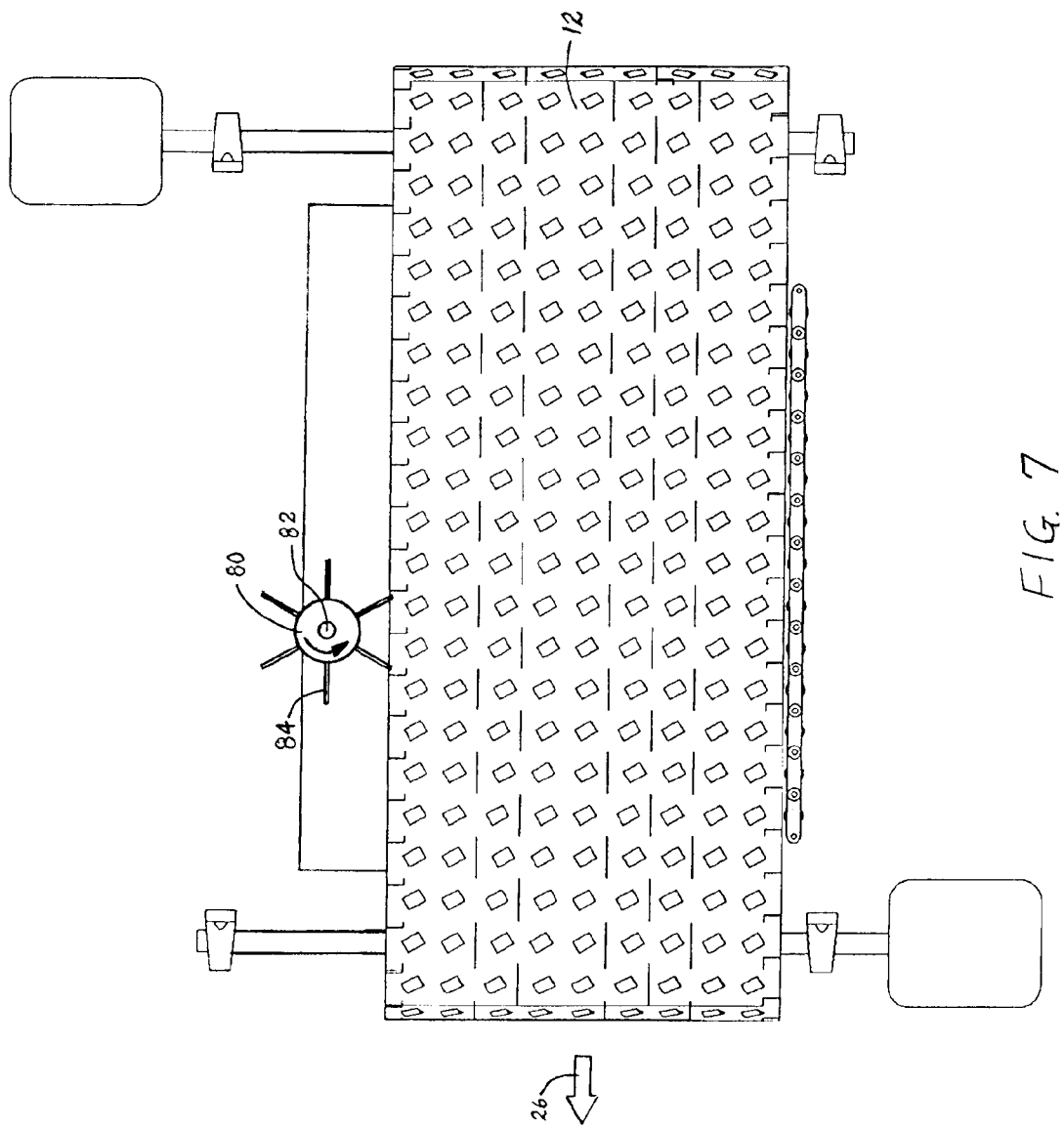
FIG. 7 is a top plan view of a another article-orienting conveyor embodying features of the invention including a paddle wheel to orient conveyed articles.

FIG. 7 shows another orientation means in an article-orienting conveyor. In this version, the orientation belts of FIGS. 1 and 5 are replaced by a paddle wheel 80 that rotates on a vertical shaft 82. Paddles 84 extending outward from the periphery of the wheel serve the same purpose as the flights of the orientation belts of FIGS. 1 and 5, which strike articles extending past the side of the conveyor belt and cause them to rotate into alignment.

Figure 8:
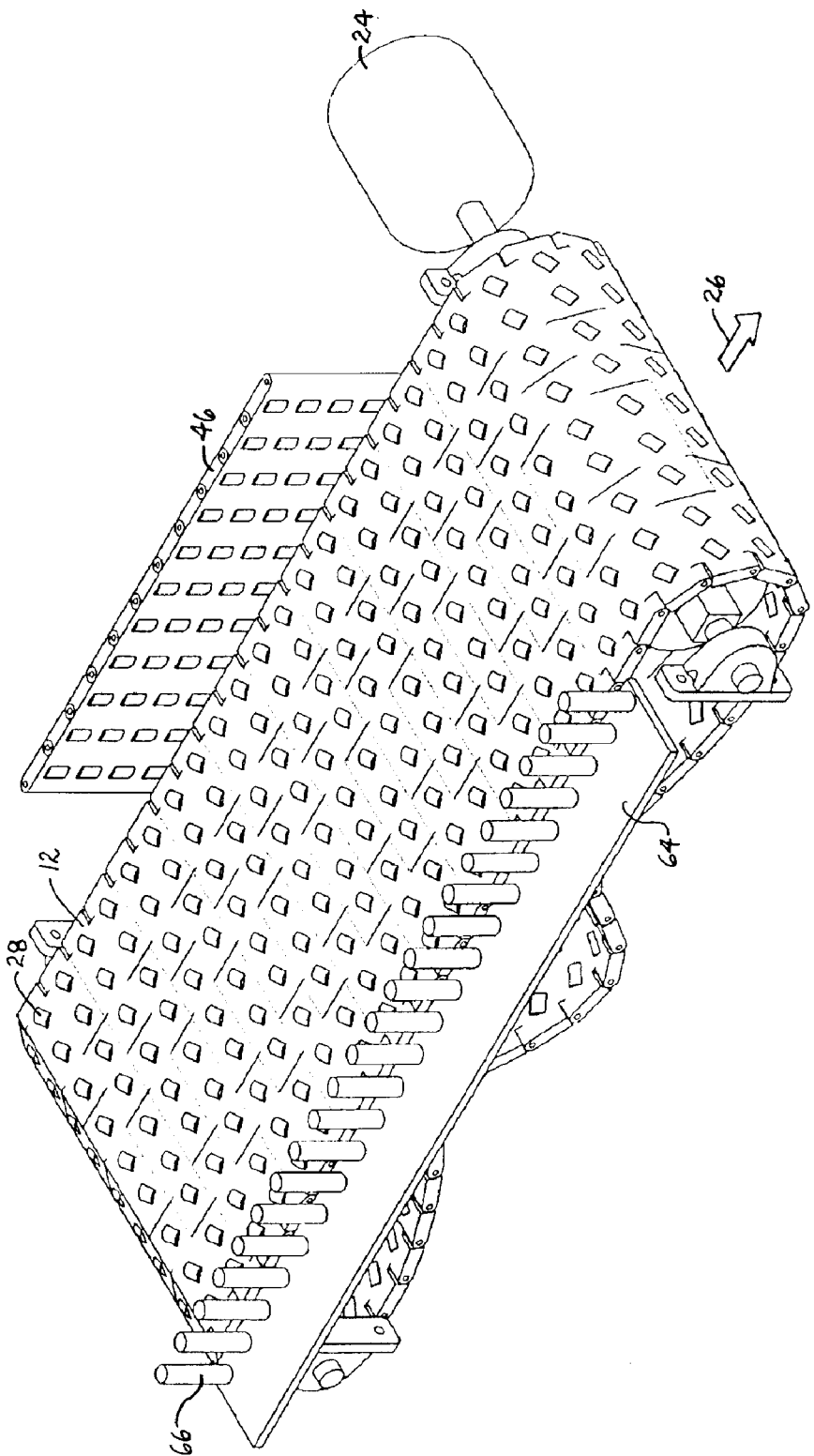
FIG. 8 is an isometric view of yet another version of article-orienting conveyor embodying features of the invention including spaced-apart stationary posts to orient conveyed articles.

Yet another orientation means in an article-orienting conveyor is shown in FIG. 8. In this version, the orientation belts of FIGS. 1 and 5 are replaced by a stationary platform 64 with upstanding obstructions in the form of posts 66. Although the posts are arranged parallel to the conveyance direction, they could be arranged at an angle relative to the conveyance direction. Because the platform and its posts are stationary, the forward motion of the conveyor belt 12 in the conveyance direction defines the relative motion between the conveyor belt and the stationary orientation means. Articles extending past the right side of the conveyor belt strike the posts, which cause the articles to rotate clockwise toward the preferred alignment position as they register against the side rail 46 as urged by the rotating rollers 28 of the conveyor belt. Because an orientation belt is not used, this conveyor needs one less drive motor and one less set of drive sprockets and of idler sprockets than the other versions.

Thus, the invention provides a conveyor that can orient articles in the preferred orientation and register them in a preferred position for downstream processing, such as at a security scanning station. The effectiveness of airport baggage security operations is increased by uniformly orienting the bags to be scanned by a scanning device with their major axes perpendicular to the scanner view. This orientation generally results in a greater viewing area with less occlusion of objects contained in the bags.

Although the invention has been described in detail with respect to a few preferred versions, other versions are possible. As one example, the bearing surfaces for the conveyor belt rollers do not have to be individual linear wearstrips. They could alternatively be a continuous conveyor pan extending transversely across the width of the conveyor belt along the carryway or an arrangement of static or dynamic rollers that contact the rollers of the conveyor belt. As another example, various orientation means were described, but others are possible. For instance, upstanding obstructions of other shapes besides flights or posts could be used effectively, including a continuous surface. Likewise, frictional surfaces other than rubber, such as ridged, dimpled, or rough-textured, could be used to contact extending portions of conveyed articles. As a further example, a conventional rollerless side rail could be used to register the articles. So, as these few examples suggest, the scope of the invention is not to be limited to the versions described in detail.

What is claimed is:

1. A conveyor comprising:
   a first conveyor belt running along a conveying path at a first velocity in a conveyance direction and extending transverse to the conveyance direction from a first side to a second side;
   wherein the first conveyor belt includes a plurality of article-supporting rollers arranged to direct supported articles toward the first side of the first conveyor belt as the first conveyor belt runs in the conveyance direction;
   a second belt arranged to run at a second velocity parallel to the first conveyor belt proximate the second side of the first conveyor belt; and
   wherein the first velocity in the conveyance direction is greater than the second velocity in the conveyance direction so that the difference between the first velocity and the second velocity causes articles on the first conveyor belt extending past the second side of the first conveyor belt conveyor belt and into contact with the second belt to rotate.

2. A conveyor as in claim 1 further comprising:
   a registration surface disposed at the first side of the first conveyor belt against which articles directed toward the first side of the first conveyor belt are registered as the belt runs.

3. A conveyor as in claim 2 wherein the registration surface comprises a rail that includes article-engaging rollers that rotate about vertical axes.

4. A conveyor as in claim 2 wherein the registration surface is disposed parallel to the conveyance direction.

5. A conveyor as in claim 1 wherein the second belt includes spaced apart flights that contact articles extending from the first conveyor belt past its second side.

6. A conveyor as in claim 1 wherein the second belt includes upstanding members that contact articles extending from the first conveyor belt past its second side.

7. A conveyor as in claim 1 wherein the second belt includes a high-friction surface that frictionally contacts articles extending from the first conveyor belt past its second side.

8. A conveyor as in claim 1 wherein the first conveyor belt and the second belt run in opposite directions.

9. A conveyor as in claim 1 wherein the first conveyor belt and the second belt run in the same direction.

10. A conveyor as in claim 1 further comprising bearing surfaces disposed beneath the first conveyor belt and wherein salient portions of the rollers extend below the first conveyor belt to ride on the bearing surfaces in rolling contact.

11. A conveyor as in claim 1 wherein the rollers rotate about axes oblique to the conveyance direction.

12. A conveyor as in claim 1 wherein the first conveyor belt and the second belt are substantially coplanar.

13. A conveyor as in claim 1 wherein the second belt is in a plane perpendicular to the plane of the first conveyor belt.

14. A conveyor for orienting and registering conveyed articles, the conveyor comprising:
    a conveyor belt advancing along a conveying path in a conveyance direction from an upstream end to a downstream end and extending transversely from a first side to a second side and including article-supporting rollers arranged to direct supported articles toward the first side of the conveyor belt;
    a registration surface disposed at the first side of the conveyor belt at its downstream end against which conveyed articles are registered;
    orientation means disposed proximate the second side of the conveyor belt for engaging portions of articles conveyed on the conveyor in an original orientation relative to the conveyance direction and that extend outward past the second side of the conveyor belt and for impeding the progress of the extending portion in the conveyance direction and causing the extending portion to move onto the conveyor belt in a different orientation.

15. A conveyor as in claim 14 wherein the orientation means comprises a second belt running in a direction opposite to the conveyance direction.

16. A conveyor as in claim 14 wherein the orientation means comprises a plurality of upstanding members spaced apart in the conveyance direction.

17. A conveyor as in claim 14 wherein the orientation means comprises a horizontal surface topped with a high-friction material.

18. A conveyor as in claim 14 wherein the orientation means comprises a second belt running in a plane perpendicular to the plane of the conveyor belt.

19. A conveyor as in claim 14 wherein the orientation means comprises a second belt substantially coplanar with the conveyor belt.

20. A conveyor as in claim 14 wherein the orientation means comprises a rotating paddle wheel having a periphery from which paddles extend outward.

21. A conveyor as in claim 14 wherein the registration surface comprises a rail including article-engaging rollers that rotate about a vertical axis.

22. A conveyor as in claim 14 wherein the registration surface is parallel to the conveyance direction.

23. A conveyor as in claim 14 further comprising bearing surfaces disposed beneath the conveyor belt and wherein salient portions of the article-supporting rollers extend below the conveyor belt to ride on the bearing surfaces in rolling contact.

24. A conveyor for orienting and registering a conveyed article, the conveyor comprising:

an angled-roller-top conveyor belt extending from a first side to a second side and running at a first speed in a conveyance direction along a conveying path and including article-supporting rollers arranged to rotate about roller axes oblique to the conveyance direction;

an orientation belt disposed parallel to the angled-roller-top conveyor belt proximate the second side of the angled-roller-top conveyor belt, the orientation belt running at a second speed opposite the conveyance direction or slower than the first speed in the conveyance direction;

a registration surface disposed at the first side of the angled-roller-top conveyor belt;

wherein the orientation belt engages an article extending past the second side of the angled-roller-top conveyor belt;

wherein the relative motion of the angled-roller-top conveyor belt and the orientation belt causes the article to rotate clockwise toward an alignment of the article in the conveyance direction;

and wherein the angled-roller-top conveyor belt guides the article toward and along the registration surface.

25. A conveyor as in claim 24 wherein the orientation belt includes spaced apart flights that engage the article extending from the angled-roller-top conveyor belt past its second side.

26. A conveyor as in claim 25 wherein the flights are spaced apart a distance less than the major horizontal axis of the conveyed article.

27. A conveyor as in claim 24 wherein the orientation belt includes upstanding members that engage the article extending from the angled-roller-top conveyor belt past its second side.

28. A conveyor as in claim 24 wherein the orientation belt includes a high-friction surface that frictionally engages the article extending from the angled-roller-top conveyor belt past its second side.

29. A conveyor as in claim 24 wherein the orientation belt is substantially coplanar with the angled-roller-top conveyor belt.

30. A conveyor as in claim 24 wherein the orientation belt is disposed in a plane perpendicular to the plane of the angled-roller-top conveyor belt and includes spaced apart flights.

31. A conveyor as in claim 24 wherein the registration surface is parallel to the conveyance direction.

* * * * *